Nov. 1, 1938.  M. L. STRAWN  2,134,743

POSITION INDICATING MECHANISM FOR MACHINE TOOLS

Filed July 3, 1936  4 Sheets-Sheet 1

INVENTOR
Marion L. Strawn
By Parker, Carlson, Pitzner & Hubbard
ATTORNEYS

Nov. 1, 1938.  M. L. STRAWN  2,134,743
POSITION INDICATING MECHANISM FOR MACHINE TOOLS
Filed July 3, 1936  4 Sheets-Sheet 2
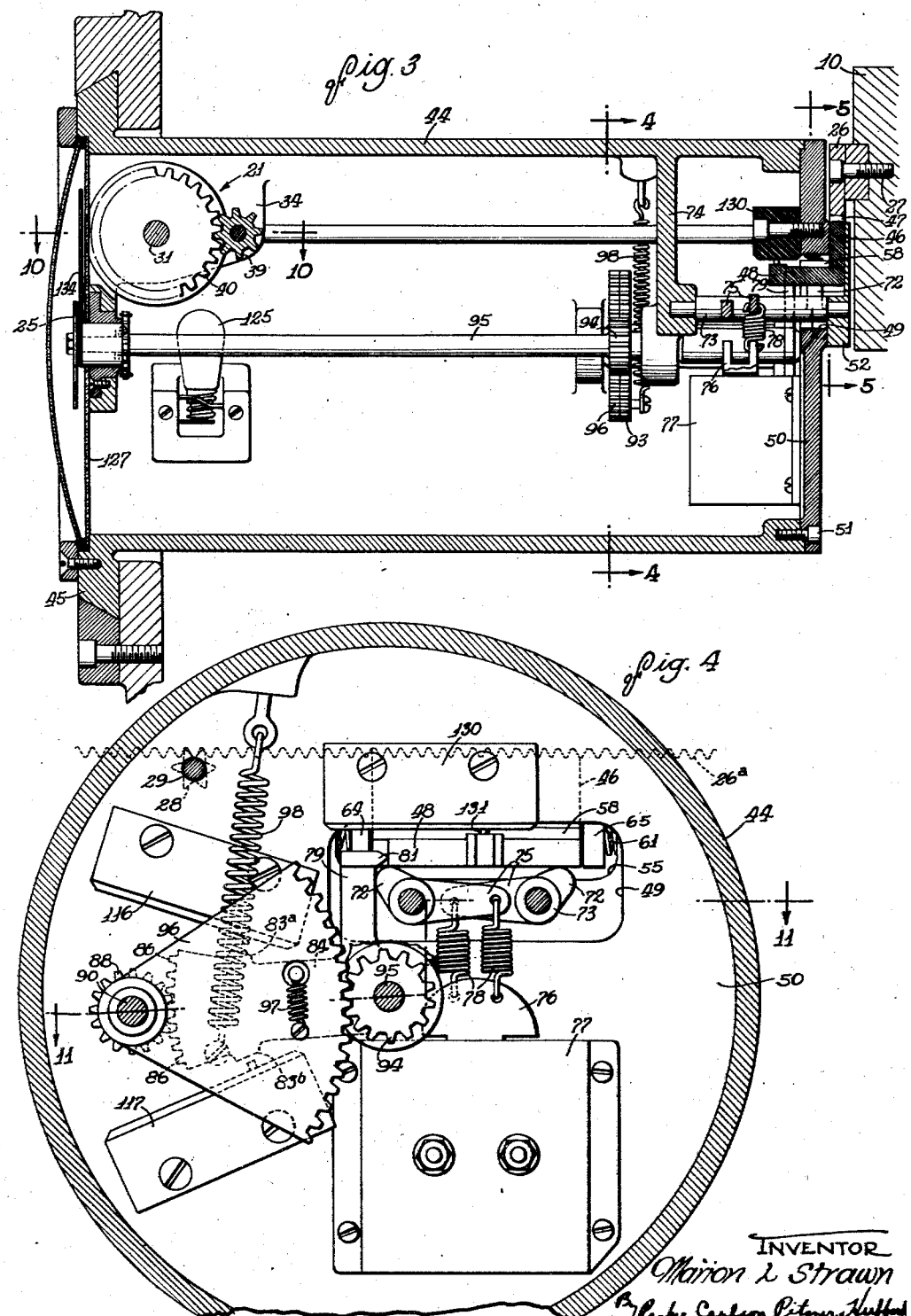

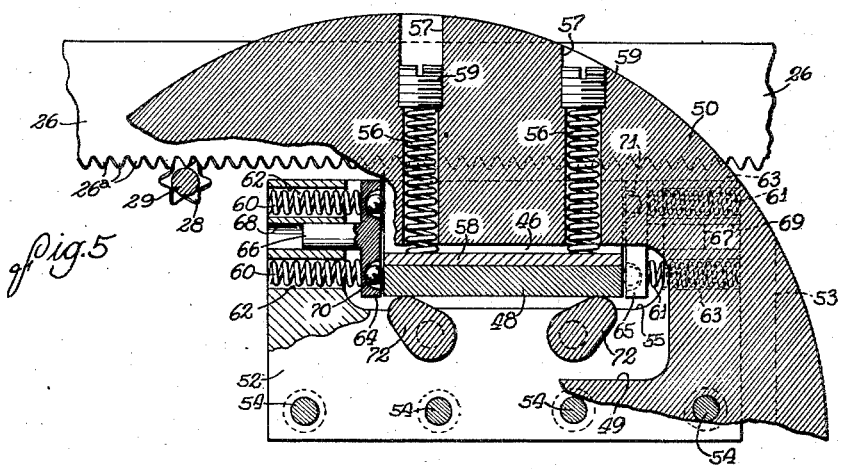
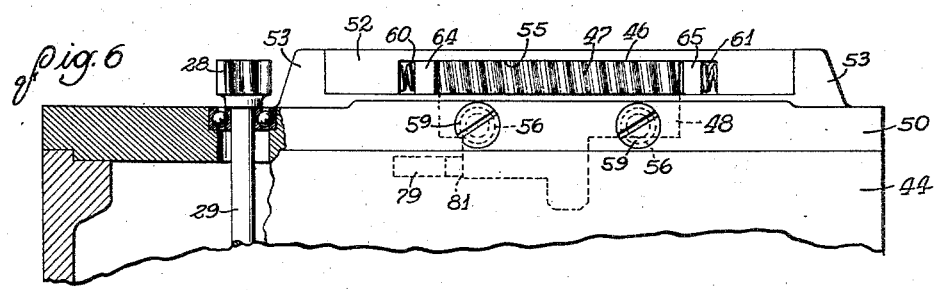
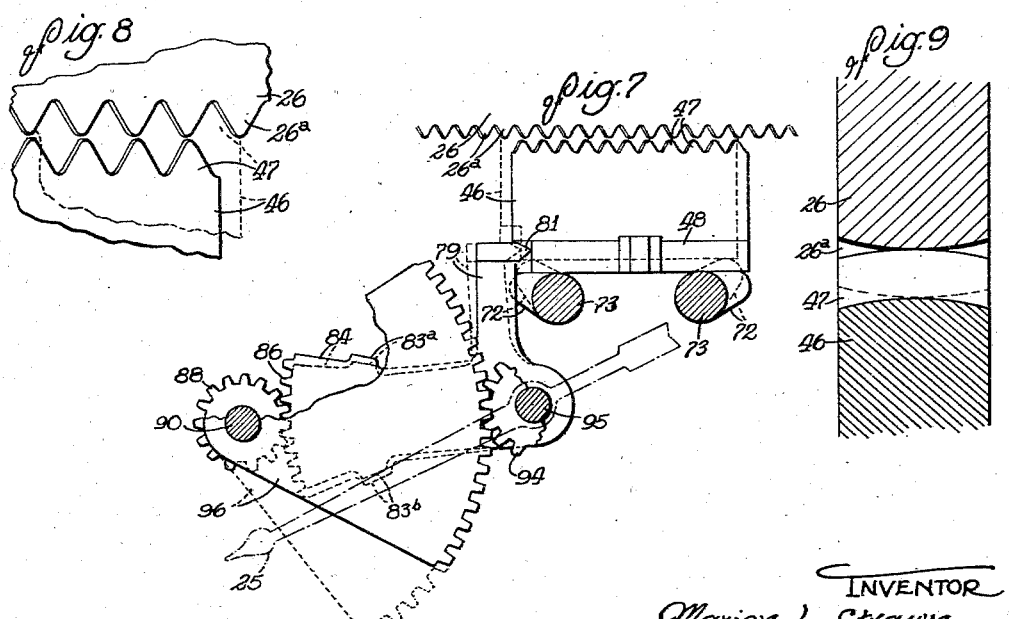

Nov. 1, 1938.                M. L. STRAWN                2,134,743
POSITION INDICATING MECHANISM FOR MACHINE TOOLS
Filed July 3, 1936                4 Sheets-Sheet 4
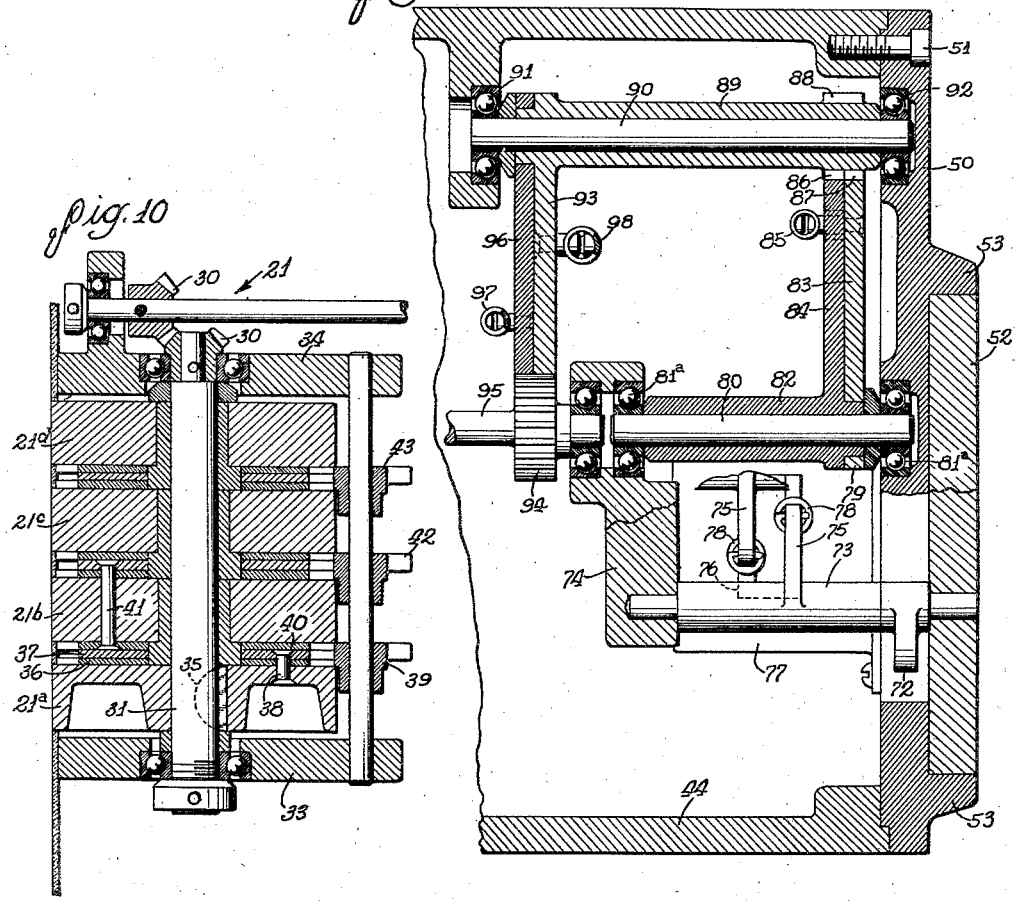
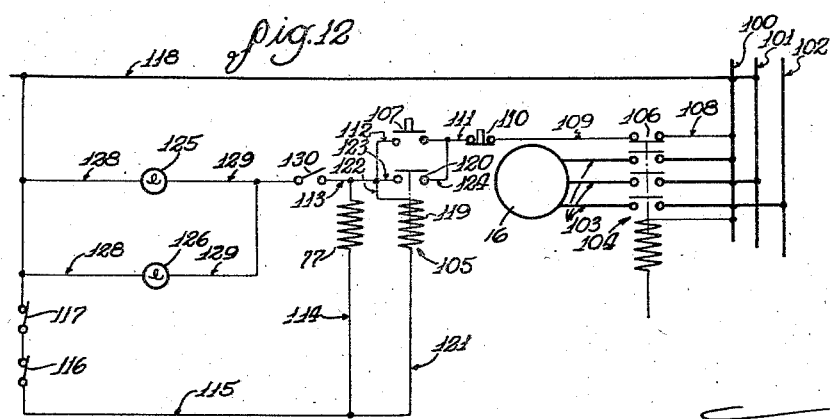
INVENTOR
Marion L. Strawn
ATTORNEYS Patented Nov. 1, 1938

2,134,743

UNITED STATES PATENT OFFICE

2,134,743

POSITION INDICATING MECHANISM FOR MACHINE TOOLS

Marion L. Strawn, Rockford, Ill., assignor to The Ingersoll Milling Machine Company, Rockford, Ill., a corporation of Illinois Application July 3, 1936, Serial No. 88,727

20 Claims. (Cl. 90—16)

The invention relates generally to machine tools and more particularly to a mechanism for indicating the position of one of the relatively movable elements thereof.

One object of the invention is to provide a novel position indicating mechanism by which the position of a movable machine tool element may be indicated with a high degree of accuracy by the combined action of one indicator continuously responsive to the movement of the element and a second independently operable indicator arranged to be rendered operative selectively to indicate the precise position of the element.

Another object is to provide an indicating mechanism of the above general character having means to disable the accurate indicator when the machine tool element is being advanced at a relatively rapid rate or when the indicator has reached the limit of its operating range.

The invention also resides in certain structural features of the accurate indicating mechanism.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawings in which Figure 1 is a partial front elevation of a machine tool embodying the invention.

Fig. 3 is a longitudinal sectional view along the line 3—3 of Fig. 1 of the indicating mechanism shown in Figs. 1 and 2.

Fig. 4 is a transverse sectional view along the line 4—4 in Fig. 3.

Fig. 5 is an enlarged fragmentary detailed view partly in section along the line 5—5 in Fig. 3 of a portion of the indicating mechanism.

Fig. 6 is an enlarged detail plan view partly in section of the indicating mechanism.

Figs. 7 and 8 are diagrammatic representations of portions of the indicating mechanism illustrating the operation thereof.

Fig. 9 is an enlarged fragmentary detailed view of the meshing rack teeth included in the indicating mechanism.

Fig. 10 is a transverse sectional view along the line 10—10 in Fig. 3.

Fig. 11 is a transverse sectional view along the line 11—11 in Fig. 4.

Fig. 12 is a wiring diagram of the electric circuits associated with the indicating mechanism.

Figure 1:
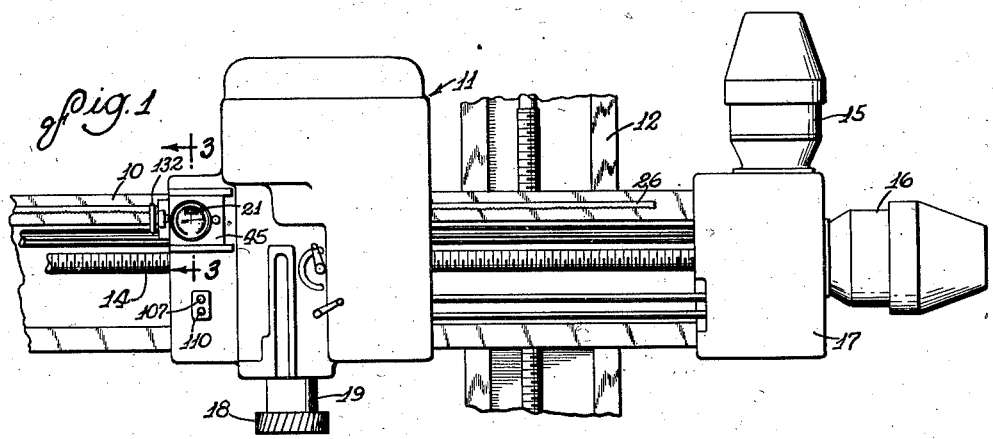

Referring more particularly to the drawings, the invention has, for purposes of illustration, been shown as a means for gauging the horizontal position of a tool head in a so-called planer type of milling machine. It will be obvious to those skilled in the art that the invention is equally applicable to many other types of machine tools and to the positioning of work tables or other machine elements. In Fig. 1, the numeral 10 designates the cross rail of the milling machine providing horizontal guideways which slidably support a tool head designated generally by the numeral 11. The rail 10 is in turn slidably mounted for vertical movement on suitable guideways formed on a vertical supporting column 12.

Translatory movement is imparted to the tool head 11 along the rail 10 by the rotation of a lead screw 14, which, in the present instance, is driven by a feed motor 15 and a rapid traverse motor 16 connected thereto through a differential gearing (not shown) housed within a casing 17. When the screw is operated by the motor 15, the tool head 11 is translated along the rail 10 at a relatively slow feed speed and when the rapid traverse motor 16 is also operating, the tool head is advanced at a rapid traverse rate. A milling cutter 18 is carried by a spindle 19 rotatably mounted on the head and driven by a motor therein.

Figure 2:
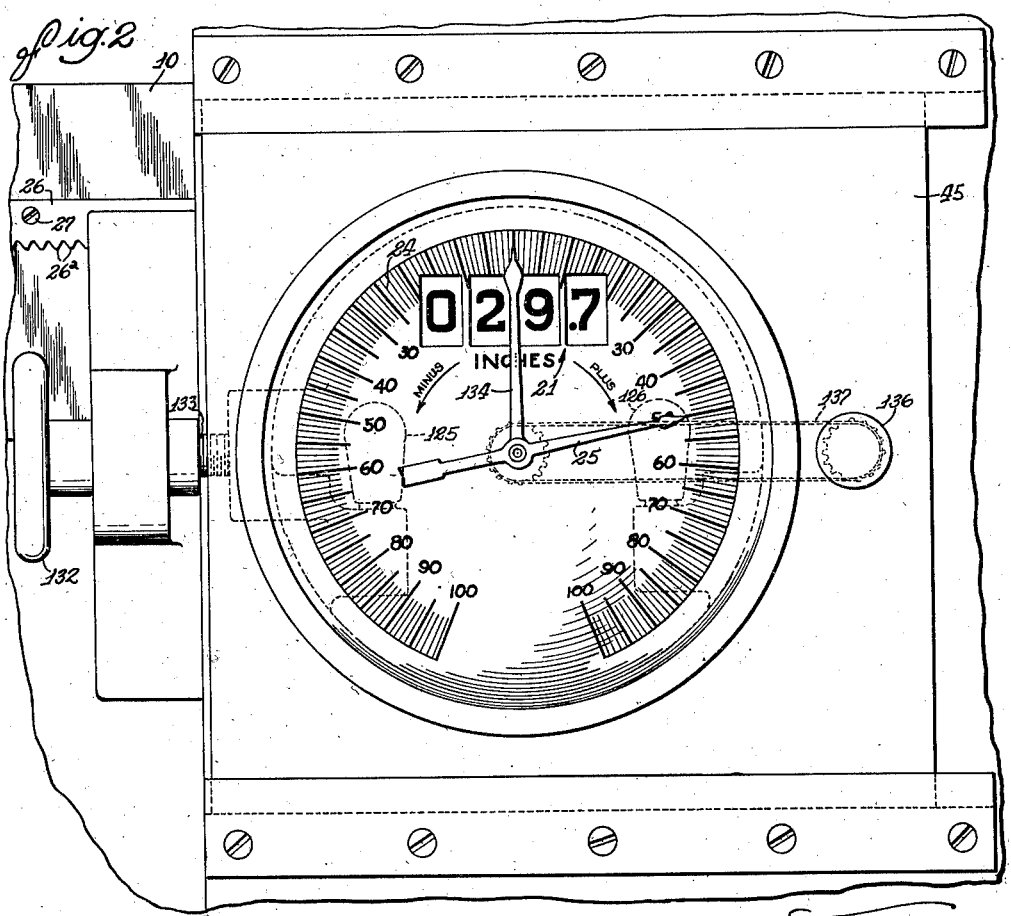
Fig. 2 is an enlarged front elevation of the visual indicating mechanism included in Fig. 1.

In accordance with the invention, a novel arrangement has been provided for indicating the exact location of the relatively movable head 11 or any point of reference thereon relative to a fixed reference point. In general, the indicating mechanism preferably includes one means for continuously indicating the approximate position of the tool head and a second means operable at will for indicating the exact location of the tool head. Thus in the construction illustrated, two visual indicators are included. One of these is designated generally by the numeral 21 and includes rotating disks 21ª, 21ᵇ, 21ᶜ and 21ᵈ (Fig. 10) having numerals on the peripheries thereof which indicate the approximate displacement of the tool head 11 from some reference point such as the adjacent edge of the vertical column 12. The indication is approximate in that it is shown in increments of only a tenth of an inch. The second visual indicator includes a scale 24 calibrated in thousandths of an inch and having "plus" and "minus" portions (Fig. 2). A pointer 25 cooperates with the scale 24 to indicate the thousandths of an inch which must be added to or subtracted from the approximate figure shown by the indicator 21 in order to determine the exact location of the tool head 11 to a thousandth of an inch.

The visual indicating mechanism illustrated for showing the approximate location of the tool head is of the conventional revolution counter type. This revolution counter mechanism is actuated by an elongated rack 26 extending along the rail 10, and rigidly secured thereto by screws 27, and a cooperating pinion 28 meshing with the rack 26. The pinion 28 is thus rotated as the tool head 11 moves along the rail 10. The pinion 28 is rigidly connected to the end of a shaft 29, which is connected through mitre gears 30 to a main operating shaft 31 of the indicating mechanism 21.

The mechanism 21 is of conventional construction and consequently need not be described herein in detail. In general the operating shaft 31 is mounted in suitable anti-friction bearings carried by end plates 33 and 34. The disk 21ᵃ is rigidly secured to the shaft 31 by a key 35 while the disks 21ᵇ, 21ᶜ and 21ᵈ are loosely journaled thereon. Toothed plates 36 and 37 are secured to the inner face of the disk 21ᵃ by a rivet 38 and mesh with a pinion 39. The pinion 39 in turn meshes with a toothed plate 40 secured to one face of the disk 21ᵇ by a rivet 41. Thus upon rotation of the shaft 31 the disk 21ᵃ is rotated and the cooperating teeth on the plates 36, 37 and 40 and pinion 39 are so related that the disk 21ᵇ will make one revolution for each ten revolutions of the disk 21ᵃ. The disk 21ᶜ is similarly connected to the disk 21ᵇ through a suitable connection including a pinion 42 so that the disk 21ᶜ turns one-tenth as fast as the disk 21ᵇ. Also the disk 21ᵈ is connected to the disk 21ᶜ through a suitable connection including a pinion 43 so that it turns one-tenth as fast as the disk 21ᶜ. The device is so calibrated that the numerals on the periphery of the disks will indicate the distance in inches and tenths thereof. The tool head 11 is spaced along the rail 10 from the selected reference point.

The indicating mechanism described above is mounted within a housing which includes a cylindrical casing 44 projecting into an opening in the front wall of the tool head 11. For a purpose to appear later, the casing 44 has a rectangular front end plate 45 having horizontal guiding edges positioned in dove-tailed guideways formed on the front wall of the tool head.

The arrangement for visually indicating the exact displacement of the tool head 11 from the approximate position shown by the indicating mechanism 21 preferably includes a toothed member mounted for bodily movement into and out of engagement with the rack 26 and also for bodily floating movement longitudinally thereof so that the member may become fully engaged with the rack teeth regardless of the position of the head. The member is connected to the pointer 25 in a manner such that the latter will indicate on the scale 24 the amount of floating movement required to bring the toothed member into exact registry with the rack 26. In the particular construction illustrated, the toothed member is illustrated in the form of a short plate or rack 46 having teeth 47 on the upper longitudinal edge thereof adapted to mesh with the teeth 26ᵃ of the rack 26.

To support the plate 46 for vertical and also the lateral floating movement, it is formed rigid with and upstanding from a horizontal plate 48 which extends through a rectangular aperture 49 formed in a disk shaped end plate 50 secured by screws 51 to the rear end of the casing 44. A second supporting plate 52 secured to the rear face of the plate 50 covers the aperture 49 and cooperates with the plate 50 to guide the plate 46 vertically while permitting horizontal movement. The plate 52 (see Figs. 5, 6 and 11) is mounted between suitable vertical flanges 53 formed on the end plate 50 and is secured to the latter by screws 54.

The toothed plate 46 is biased downwardly out of engagement with the rack 26 by a pair of compression springs 56 (Fig. 5) mounted in bores 57 in the end plate 50. These springs bear against a wear plate 58 secured to the top of the horizontal plate 48, and plugs 59 threaded in the bores 57 serve to adjust the tension in the springs. Longitudinal floating movement of the toothed plate 46 in opposite directions is yieldably resisted by pairs of springs 60 and 61 mounted in bores 62 and 63 formed in the plate 52 and respectively disposed on opposite sides of the plate 46. The outer ends of the springs 60 and 61 thus bear against the flanges 53 on plate 50 while the inner ends thereof bear against the rear faces of plates 64 and 65 on plungers 66 and 67 slidable in bores 68 and 69 which prevent tilting of the guides. Hardened steel balls 70 and 71 are mounted in suitable pockets formed in the faces of guide plates and bear against the adjacent end surfaces of the toothed plate 46 as shown in Fig. 5.

Means is provided for moving the toothed plate 46 against the bias of the springs 56 into engagement with the rack 26. This means includes a pair of cams 72 rigidly connected to shafts 73 having their opposite ends mounted in plate 52 and a partition 74 in the casing 44 (Fig. 3). Operating arms 75 rigidly secured to the shafts 73 are connected to an armature 76 of a suitable actuating solenoid 77 by tension springs 78. Thus upon energization of the solenoid 77 the armature 76 as well as its attached arms 75 are moved downwardly so that the cams 72 are rotated to an upright position. The cams 72 bear against the lower surface of the horizontal plate 48 so that the toothed plate 46 will be projected upwardly toward the rack 26 and into engagement therewith whenever the solenoid is energized.

As the toothed plate 46 is moved toward the rack 26, the teeth thereon engage the tooth of the rack and are cammed thereby in one direction or the other as the plate teeth come into full mesh with the rack teeth. Thus the plate 46 is shifted longitudinally of the rack in one direction or the other a variable distance depending on the relative positions of the rack and plate teeth at the time the solenoid is energized.

The mechanism for transmitting the resultant longitudinal floating movement of the toothed plate 46 to the pointer 25 includes a bell-crank lever 79 (see Figs. 4 and 11) loose on a sleeve 82 carried by a shaft 80. A knife edge 81 on the lever bears against the adjacent end of the plate 48, such engagement being maintained by a spring 98 acting on an arm 83 of the lever. The shaft 80 is journaled in suitable anti-friction bearings 81ᵃ mounted in the end plate 50 and a partition 74. An arm 84 formed on the sleeve 82 is disposed alongside the arm 83 and is connected thereto by a tension spring 85 to form a back-lash take-up connection between the levers. The outer ends of the arms 83 and 84 are in the form of toothed sectors 86 and 87 respectively which mesh with a pinion 88 carried by a sleeve 89 loosely journaled on a shaft 90 which is supported in suitable anti-friction bearings 91 and 92. A toothed sector 93 is rigidly secured to the sleeve 89 and meshes with a pinion 94 on a shaft 95 connected at its opposite end to the visual indicator pointer 25. The sector 93 is also provided with a back-lash take-up mechanism including a corresponding sector 96 loosely journaled on the sleeve 89 also meshing with the pinion 94. The sectors 96 and 93 are connected by a tension spring 97.

Upon reference to Fig. 7, it will be seen that if the teeth 47 of plate 46 are located slightly to the left of the high points of the teeth 26ᵃ on rack 26 before their engagement that the plate 46 will be displaced a short distance to the left as the teeth move into exact registry. As a consequence the lever 79 is rotated a short distance in counter-clockwise direction to a position shown in dotted lines in Fig. 7. This movement is transmitted through and augmented by the pinion 88 and sector 96 so that shaft 95 is rotated in a counter-clockwise direction a corresponding but greater distance than the movement of the toothed plate. This rotation of the shaft 95 rotates the pointer 25 of the visual indicator.

In the particular construction illustrated, the distance between the high and low points of the teeth 26ᵃ on the rack 26 is 0.100 inch. In such case, if the high points of the teeth 47 on plate 46 first contact the teeth 26ᵃ at a point 0.085 inch from the low point of the teeth 26ᵃ the plate 46 will move the latter distance to the left. The pointer 25 will in such case register a "minus" reading of 0.085 of an inch. Such reading is subtracted from the reading of the counter mechanism 32 in order to obtain the reading for the exact setting or position of the tool head 11. Similarly as shown in Fig. 8, if the teeth 47 on the plate 46 are located just to the right of the high points of the teeth 26ᵃ on the rack before they move into mesh, the plate 46 will be displaced a short distance to the right as it moves into mesh. The tension spring 98 secured to the sector 93 and to the casing 44 maintains the knife edge 81 in contact with the end of the plate 46 so that the shaft 95 is rotated in a clockwise direction as viewed in Figs. 4 and 7. A "plus" reading is thus given on the scale 24 by the pointer 25 which represents the amount which should be added to the approximate indication of the counter mechanism 21 to ascertain the exact location of the tool head 11.

It will be apparent from the foregoing description of the operation of the apparatus that the accuracy of the reading obtained will depend in a large part upon the precision with which the complemental teeth on the rack 26 and plate 46 are formed. In order to obtain a high degree of precision in this respect, the teeth on the rack and plate are preferably formed by a screw threading operation. That is, a screw thread is cut on the periphery of a portion of metal stock in a lathe and the threads may then be ground by well known methods to the exact dimensions required with great nicety. The threaded portion of metal stock thus formed is then cut into sectors of suitable thickness to form the rack and plate. Fig. 9 is an enlarged fragmentary view of the mating teeth 26ᵃ and 47 illustrating particularly the screw threaded form. Upon reference to this figure, it will be seen that the teeth contact only at their center points rather than throughout their length thus adding to the precision of operation of the indicating mechanism.

To avoid possible damage to the sensitive indicating mechanism, a suitable interlock between the energizing circuit of the rapid traverse motor 16 and the energizing circuit for the actuating solenoid 77 has been provided so that the solenoid is maintained disabled and the plate 46 cannot be moved into engagement with the rack 26 while the tool head 11 is moving at a rapid traverse rate. Upon reference to Fig. 12, it will be seen that current is supplied to the rapid traverse motor 16 having supply lines 100, 101 and 102 through branch conductors 103, which are connected to the supply lines by a contactor 104. The contactor 104 is connected to any suitable main control circuit. The connection of solenoid 77 across supply lines 100, 101 is controlled by a contactor 105 and an extra set of contacts 106 on the contactor 104. It will be noted that the contacts 106 are only closed when the main contacts of the contactor 104 are opened.

Thus, when the rapid traverse motor 16 is stopped by opening of the main contacts of contactor 104, the exact position indicator may be operated by energization of the solenoid 77 upon closure of a starting push button 107. This completes a circuit from supply line 100 through conductor 108, contacts 106, conductor 109, normally closed stop push button 110, conductor 111, start push button 107, and conductors 112, 113. The other side of the solenoid 77 is connected to the supply line 101 through conductors 114, 115, limit switches 116, 117, and conductor 118. The closure of starting push button 107 also completes an energizing circuit for actuating a winding 119 of contactor 105 so that contacts 120 thereof are closed, completing a sealing circuit for the contactor and solenoid. It will be noted that one terminal of the actuating winding 119 is connected to conductor 115 through conductor 121 while the other terminal is connected to conductor 113 through conductor 122. Closure of the contacts 120 completes a shunt circuit about the momentarily actuated starting push button 107 through conductors 123 and 124. The solenoid 77 and contactor 105 may be deenergized to release the toothed plate 46 by opening of the stop push button 110.

In some instances, the teeth 47 on the plate 46 may be located exactly in registry with the teeth 26ᵃ on the rack 26 so that no longitudinal movement on the plate and consequently no movement of the pointer 25 results when the solenoid 77 is energized. This might lead to some confusion on the part of the operator as he would not be sure if the indicating mechanism were operating properly. In order to avoid this difficulty, a pair of indicating lamps 125 and 126 are disposed behind a translucent disk 127 on which the scale 24 is printed. These pilot lamps are lighted upon movement of the plate 46 into mesh with the rack 26. Upon reference to Fig. 12, it will be seen that pilot lamps 125 and 126 are connected to conductor 118 by conductors 128 and to conductor 113 through conductors 129 and switch 130. This switch is mounted on the casing end plate 50 adjacent the toothed plate 46 (Fig. 4) and is provided with an actuating pin 131. The pin 131 is moved upwardly to close the normally open switch 130 in response to upward movement of the plate 48 which is attached to the toothed plate 46. It will thus be seen that the pilot lamps 125, 126 not only serve to illuminate the scale 24 but also give the operator a definite indication that the plate 46 has moved into mesh with the rack 26.

In the operation of the machine tool described above, a work piece is secured to the table of the machine tool below the cross rail 10 and at some selected distance from a reference point on the machine such as the inner edge of the vertical column 12. The tool head 11 is then moved toward the work piece at a rapid traverse rate until the milling cutter 11 is in a position to engage the work piece. During this traversing movement, the approximate location of the tool head is continuously indicated by the mechanism 21, as described above, since the driving pinion 28 thereof is continuously in mesh with the rack 26. Upon completion of the desired rapid traverse movement, the motor 16 is deenergized and the movement of the tool head 11 is continued at a relatively slower feed rate by the feed motor 15. The metal removing operation performed by the milling cutter 18 is then continued until a cut of some selected length has been made.

The novel indicating mechanism described above makes it possible to determine this point with great accuracy and precision, and with a minimum expenditure of time. For example, it may be desirable to move the tool head 11 at a slow or feed rate until the axis of the milling cutter 18 is exactly 29.75 inches from the adjacent edge of the vertical column 12. In such a case, the exact reading portion of the indicating mechanism may be set in operation during the feed movement of the milling cutter 18 by closing the starting push button 107. Upon closure of this push button, the solenoid 77 is operated and the toothed plate 26 is moved into mesh with the rack 26. The longitudinal displacement of the plate 26, in thus moving into mesh, causes a motion of the pointer 25 either to the right or left as the case may be thus indicating the exact displacement of the milling cutter from the approximate position indicated by the mechanism 32. This may be "plus 30" when the indicator is first set in operation. Then as the cutting operation continues, the indicating pointer 25 will move from "30" to "50" on the scale 24. At this point the operator is apprised of the fact that the cutter has reached the desired position whereupon the machine is stopped. The plate 46 is then retracted by the biasing springs 56 upon deenergization of the solenoid 77 on opening of the stop push button 118.

In view of the limited range of the scale 24, an arrangement has been provided for deenergizing the solenoid 77 in case a safe predetermined maximum amplitude of movement is exceeded. It will be apparent that this arrangement is particularly advantageous in case the indicator mechanism is used while a tool head is being moved at a feed rate. In the particular construction illustrated, this safety arrangement includes the limit switches 116 and 117 which are disposed on opposite sides of the lever arm 83. This lever arm is provided with projections 83ª and 83ᵇ which serve to open the normally closed limit switches upon contact therewith. Upon reference to Fig. 12, it will be seen that the opening of either of the limit switches 116 or 117 breaks the energizing circuit of the solenoid 77 as well as of contactor 105 so that the solenoid is deenergized and the toothed plate 46 moves out of mesh with the rack 26 back to its original position.

In some particular machining operations it may be desirable to move the translatory machine tool element to some position located at an odd or unusual dimension from the established reference point and then move it in successive small increments to other points. Thus, it may be desirable to move the tool head 11 to a point 29.75 inches from the adjacent edge of the vertical column 12 and then to move the same further from the column in increments of .003 of an inch. In such a case, there is some danger of miscalculation in adding the increments to the reference number 29.75. In order to avoid this difficulty, a mechanism has been provided for shifting the pointer 25 to its zero position irrespective of the location of the tool head 11 on the rail 10. This mechanism includes a manually operable hand wheel 132 connected to an adjusting screw 133 on the side of the indicating mechanism casing 4 (Fig. 2). Upon rotation of the hand wheel 132, the entire indicating mechanism is shifted laterally along the guides 45. As a result, the teeth 47 on the plate 46 may be brought into exact registry with the rack teeth so that the pointer 25 assumes its zero position. The tool head 11 may then be moved in the desired successive increments which will be indicated on the scale 24. An auxiliary pointer 134 is mounted on the indicating dial and serves to mark the location of the pointer 25 before making the manual adjustment described above. The indicator 134 is mounted on a bushing 135 surrounding the shaft 95 and is connected to a rotatable manual adjusting knob 136 by a chain 137.

From the foregoing, it will be seen that a machine tool has been provided which can be operated with a high degree of speed and accuracy. The dual indicating mechanism included therein makes it possible not only to indicate the approximate position of a cutting tool to the operator continuously, but also enables him to determine instantaneously with great nicety the exact location of the tool. Thus, the mechanism is extremely flexible in that it permits the length of a cutting movement being performed to be gauged accurately and also enables the tool to be moved to and positioned with precision in a preselected position.

Although a particular embodiment of the invention has been shown and described in some detail for purposes of illustration of the invention, no intention to limit the invention to the particular construction shown should be inferred, but on the other hand, the appended claims are intended to cover all modifications within the spirit and scope of the invention.

I claim as my invention:

1. A machine tool comprising, in combination, a plurality of relatively movable machine tool elements, an elongated toothed rack carried by one of said elements, a member having complemental teeth thereon engageable with the teeth of said rack, means supporting said toothed member on another of said machine tool elements for floating movement longitudinally of said rack and normally out of engagement therewith, means operable at will to move said member into engagement with said rack, and means for visually indicating the magnitude of the longitudinal floating movement of said member required to bring the complemental teeth on said rack and said member into exact registering engagement upon the actuation of said last named means and thereby indicating the relative positions of said machine tool elements.

2. A machine tool comprising, in combination, a plurality of relatively translatable machine tool elements, a pair of members carried by the respective elements and having complemental recesses and projections adapted for interfitting engagement, said members being mounted for relative yielding movement in the direction of relative movement between said elements and for transverse movement into and out of interengagement, means operable at will to move said toothed members into and out of engagement, and means for indicating the relative longitudinal movement between said toothed members required to bring them into exact registering engagement upon the actuation of said last named means.

3. A machine tool comprising, in combination, a plurality of relatively movable machine tool elements, an elongated toothed rack carried by one of said elements, a plate having complemental teeth formed along a transverse edge thereof engageable with the teeth of said rack, means including springs located at opposite ends of said plate for supporting the same on another of said machine tool elements for floating movement of said rack and for preventing tilting thereof about a transverse axis, means for normally maintaining the teeth on said plate out of engagement with said rack, means including an operating solenoid for selectively moving said plate toward said rack, means connected to said plate for magnifying and visually indicating the longitudinal floating movement of said plate required to bring the complemental teeth on said rack and said plate into exact registering engagement upon the actuation of said last named means and thereby indicating the relative positions of said machine tool elements.

4. A machine tool comprising, in combination, a plurality of relatively movable machine tool elements, a sector of an elongated screw threaded member rigidly secured to one of said elements and forming a rack thereon, a second shorter rack formed from a sector of a screw threaded member, said racks being mounted for movement into and out of meshing engagement and also for relative longitudinal movement to bring the teeth thereof into full mesh, and means including a visual indicating member operatively connected to said second rack for visually indicating the position of said one machine tool element with respect to another of said machine tool elements.

5. A machine tool comprising, in combination, a plurality of relatively movable machine tool elements, means including an indicator for showing the approximate relative position of one of said elements, an elongated toothed rack carried by said one element, a member having complemental teeth thereon engageable with the teeth of said rack, means supporting said toothed member on another of said machine tool elements for floating movement longitudinally of said rack and normally out of engagement therewith, means operable at will to move said member into engagement with said rack, and means for visually indicating the magnitude of the longitudinal floating movement of said member required to bring the complemental teeth on said rack and said member into exact registering engagement upon the actuation of said last named means and thereby accurately indicating the exact displacement of said one machine tool element from the indicated approximate position.

6. A machine tool comprising, in combination a plurality of relative movable machine tool elements, a rack carried by one of said elements, a visual indicator, means including a pinion carried by another of said elements meshing with said rack and operatively connected to said indicator for showing the approximate relative position of said other element, a member having complemental teeth thereon engageable with the teeth of said rack, means supporting said toothed member on said other machine tool element for floating movement longitudinally of said rack and normally out of engagement therewith, means operable at will to move said member into engagement with said rack, and means for visually indicating the magnitude of the longitudinal floating movement of said toothed member required to bring the complemental teeth on said rack and said member into exact registering engagement upon the actuation of said last named means and thereby accurately indicating the exact displacement of said other machine tool element from the indicated approximate position.

7. A machine tool comprising, in combination, a translatable machine tool element, a guideway supporting the same, an elongated toothed rack mounted adjacent said guideway, a pinion meshing therewith, means including a revolution counter operatively connected to said pinion for indicating the displacement of said element from a reference point in increments of tenths of an inch, a member having complemental teeth thereon engageable with the teeth of said rack, means supporting said toothed member on said element for floating movement longitudinally of said rack and normally out of engagement therewith, means operable at will to move said member into engagement with said rack, an indicating dial calibrated in thousandths of an inch and a pointer cooperating therewith, and means for moving said pointer an amount corresponding to the floating movement of said member required to bring the complemental teeth on said rack and said member into full meshing engagement upon the actuation of said last named means and thereby indicating the exact displacement of the element from said reference point in thousandths of an inch.

8. A machine tool comprising, in combination, a plurality of relatively movable machine tool elements, a sector of an elongated screw threaded member rigidly secured to one of said elements and forming a rack thereon, a member having complemental teeth thereon engageable with the teeth of said rack and formed from a short sector of a screw threaded member, means supporting said toothed member on another of said machine tool elements for floating movement longitudinally of said elongated rack and normally out of engagement therewith, means operable at will to move said member into engagement with said elongated rack, and means for visually indicating the magnitude of the longitudinal floating movement of said member required to bring the complemental teeth on said rack and said member into full meshing engagement upon the actuation of said last named means.

9. A machine tool comprising, in combination, a plurality of relatively movable machine tool elements, means including an indicator for continuously showing the approximate relative position of one of said elements, and means operable only when said element is moving at a speed below a predetermined value or is stationary for indicating the exact displacement of the element from such approximate position.

10. A machine tool comprising, in combination, a plurality of relatively movable machine tool elements, power actuated means for effecting relative movement between said elements at feed and rapid traverse rates, mechanism operative through a limited range of movement between said elements to indicate accurately the extent of such movement, and means operating automatically to disable said indicating mechanism during relative movement between said elements at said rapid traverse rate while said elements are stationary or moving at said feed rate.

11. A machine tool comprising, in combination, a translatable machine tool element, a power actuated mechanism for moving said element at a relatively slow feed rate, a second power actuated mechanism for moving said element at a relatively rapid traverse rate, an electric control circuit for said second actuating mechanism, a visual indicator for showing the position of said machine tool element in its path of translatory movement, selectively operable means including an electric circuit for rendering said visual indicator operative and inoperative, and means interlocking said circuits of said indicator and said second power actuated mechanism to prevent the operation of said indicator when said machine tool element is moving at a rapid traverse rate.

12. A machine tool comprising, in combination, a translatable machine tool element, a power actuating mechanism for said element having an electric control circuit, means including an indicator for showing the approximate position of said machine tool element in its path of translatory movement, a visual indicator for showing the exact displacement of said machine tool element from such approximate position, selectively operable means including an electric circuit for rendering said second indicator operative and inoperative, and means interlocking said electric circuits to prevent the operation of said indicator except when said machine tool element is moving at a speed less than a predetermined value or is stationary.

13. A machine tool comprising, in combination, a plurality of relatively movable machine tool elements, mechanism continuously responsive to the relative movements between said elements to indicate the position of one element relative to the other, independently operable mechanism normally maintained inactive and arranged when rendered active to indicate the exact location of the movable element relative to the approximate position indicated by said first mentioned mechanism, and automatically acting means to disable said second mechanism during relative movement between said elements above a predetermined rate.

14. A machine tool comprising, in combination, a plurality of relatively movable machine tool elements, an elongated toothed rack carried by one of said elements, a member having complemental teeth thereon engageable with the teeth of said rack, means supporting said toothed member on another of said machine tool elements for floating movement longitudinally of said rack and normally out of engagement therewith, actuating means operable at will to move said member into engagement with said rack, means for visually indicating the magnitude of the floating movement of said member required to bring the complemental teeth on said rack and said member into exact registering engagement upon the actuation of said actuating means and thereby indicating the relative positions of said machine tool elements, and a pilot light for indicating when said rack and member are in engaged relation.

15. A machine tool comprising, in combination, a plurality of relatively translatable machine tool elements, a pair of toothed members carried by the respective elements and mounted for movement into and out of meshing engagement and also for yielding movement longitudinally of the direction of relative movement between the elements, the teeth on said members extending substantially transverse to said direction, actuating means operable at will to move said toothed members into and out of engagement, means for indicating the relative longitudinal movement between said toothed members required to bring them into full meshing engagement upon the actuation of said last named means, and means for causing said actuating means to move said members out of engagement in response to a predetermined maximum longitudinal movement therebetween.

16. A machine tool comprising, in combination, a plurality of relatively movable machine tool elements, an elongated toothed rack carried by one of said elements, a plate having complemental teeth formed along a transverse edge thereof engageable with the teeth of said rack, means including springs located at opposite ends of said plate for supporting the same on another of said machine tool elements for floating movement longitudinally of said rack, means for normally maintaining the teeth on said plate out of engagement with said rack, means including an operating magnet for selectively moving said plate towards said rack, means including a linkage operatively connected to said plate for visually indicating the magnitude of the longitudinal floating movement of said plate required to bring the complemental teeth on said plate and said rack into exact registering engagement upon the actuation of said last named means, and means including a pair of limit switches associated with said linkage for deenergizing said magnet in response to a predetermined maximum relative movement between said plate and said rack.

17. A machine tool comprising, in combination, a translatory machine tool element, means including an indicator for showing the approximate position of said element in its path of movement, means including a second indicator for accurately showing the precise displacement of the element from such approximate position, and manually operable means for moving said second indicator to its zero position independently of said element whereby to facilitate the measurement of exact increments of movement of said element from any selected reference point.

18. A machine tool comprising, in combination, a plurality of relatively movable machine tool elements, an indicator having a member movable in unison with the relative movements between said elements and operable to indicate the exact relative positions thereof through a relatively short range of such relative movement, and means operating automatically to disconnect said member from said elements when the member reaches the limit of said range.

19. A machine tool comprising, in combination, a plurality of relatively movable machine tool elements, a rack constituted by a segregated sector of an elongated screw threaded member and carried by one of said elements, a toothed member disposed for meshing engagement with said rack, means for effecting relative movement between said rack and toothed member to shift the same into and out of meshing engagement, and means for indicating the relative movement between said rack and toothed member longitudinally of the rack required to bring the same into exactly registering mesh.

20. In a machine tool comprising, in combination, a plurality of relatively movable machine tool elements, means including an indicator for showing continuously the location of one of said elements relative to a reference point on another of said elements in approximate or relatively large increments of measurement, and indicator means rendered operable or inoperable independently of the continuous operation of said first named indicator for indicating in exact or relatively small increments the actual displacement of said one element from the position indicated in larger increments by said first named indicator, whereby the combined readings of said two indicators show the exact total displacement of said one element from said reference point.

MARION L. STRAWN.